(12) United States Patent
Zhang et al.

(10) Patent No.: US 8,982,883 B2
(45) Date of Patent: Mar. 17, 2015

(54) METHOD AND APPARATUS FOR AIDING THE ESTABLISHMENT OF THE MULTICAST BACKHAUL IN THE FIXED NETWORK FOR MOBILE MULTICAST SERVICE

(75) Inventors: Qingshan Zhang, Shanghai (CN); Songwei Ma, Shanghai (CN); Fanxiang Bin, Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 408 days.

(21) Appl. No.: 13/129,979

(22) PCT Filed: Dec. 8, 2009

(86) PCT No.: PCT/CN2009/075415
§ 371 (c)(1),
(2), (4) Date: May 18, 2011

(87) PCT Pub. No.: WO2010/081359
PCT Pub. Date: Jul. 22, 2010

(65) Prior Publication Data
US 2011/0222461 A1  Sep. 15, 2011

(30) Foreign Application Priority Data
Jan. 16, 2009  (CN) .......................... 2009 1 0045501

(51) Int. Cl.
*H04L 12/18* (2006.01)
*H04W 72/00* (2009.01)
*H04W 84/04* (2009.01)

(52) U.S. Cl.
CPC .......... *H04W 72/005* (2013.01); *H04W 84/045* (2013.01)

USPC .......................................... 370/390; 370/432

(58) Field of Classification Search
None
See application file for complete search history.

(56) References Cited

U.S. PATENT DOCUMENTS

| 7,096,039 B2 | 8/2006 | Chuah et al. |
| 2004/0002362 A1 | 1/2004 | Chuah et al. |

(Continued)

FOREIGN PATENT DOCUMENTS

| CN | 101005321 A | 7/2007 |
| CN | 101170821 A | 4/2008 |

(Continued)

OTHER PUBLICATIONS

"Universal Mobile Telecommunications System (UMTS); Multimedia Broadcast/Multicast Service (MBMS); Architecture and Functional Description (3GPP TS 23.246 Versiob 7.3.0 Release 7)," ETSI TS 123 246 V.7.3.0, Jun. 2007.

(Continued)

*Primary Examiner* — Duc Duong
(74) *Attorney, Agent, or Firm* — Harness, Dickey & Pierce

(57) ABSTRACT

Method and apparatus for decreasing multi-cell feedback overhead is provided in the present invention. Wherein a mobile user terminal equipment utilizes a first period to feedback short-term channel direction information of a serving base station, utilizes a second period to feedback long-term channel direction information of neighboring base stations, further, the mobile user terminal equipment utilizes a third period to feedback long-term relative amplitude information, utilizes a fourth period to feedback short-term relative phase information, wherein the first period is shorter than the second period, and the third period is longer than the fourth period.

11 Claims, 4 Drawing Sheets

(56) References Cited

U.S. PATENT DOCUMENTS

| | | | |
|---|---|---|---|
| 2007/0076715 A1* | 4/2007 | Bauer et al. | 370/390 |
| 2007/0293249 A1 | 12/2007 | Wang | |
| 2008/0101282 A1 | 5/2008 | Ogura | |
| 2008/0151911 A1* | 6/2008 | Chen | 370/400 |
| 2009/0129308 A1* | 5/2009 | Fukui | 370/315 |
| 2009/0141646 A1* | 6/2009 | Legg | 370/252 |
| 2009/0168680 A1* | 7/2009 | Singh et al. | 370/312 |
| 2010/0177674 A1* | 7/2010 | Aggarwal | 370/312 |

FOREIGN PATENT DOCUMENTS

| | | |
|---|---|---|
| CN | 101179495 A | 5/2008 |
| CN | 101227307 A | 7/2008 |
| EP | 1 919 124 | 5/2008 |
| WO | WO-2008093472 A1 | 8/2008 |

OTHER PUBLICATIONS

Search Report for corresponding European Application No. 09838146.0 dated May 15, 2012.

International Search Report.

Office Action for corresponding Chinese Application No. 200910045501.0 dated Jul. 1, 2013.

Grant text for Chinese Application No. 200910045501.0 dated Jun. 25, 2014.

International Search Report, Mar. 18, 2010.

* cited by examiner

METHOD AND APPARATUS FOR AIDING THE ESTABLISHMENT OF THE MULTICAST BACKHAUL IN THE FIXED NETWORK FOR MOBILE MULTICAST SERVICE

FIELD OF THE INVENTION

The present invention relates to telecommunication network, more particularly, to method and apparatus for aiding the establishment of the multicast backhaul in the fixed network for mobile multicast service.

BACKGROUND OF THE INVENTION

Femtocell technology is a hot issue in the telecommunication industry. It is a solution for extending mobile telecommunication indoor coverage, and can transmit voice or data call initiated by a mobile user terminal, for example mobile phone or Personal Digital Assistant (PDA), to the 3G mobile Core network based on the standard interface via the backhaul in the fixed network. That is, Femtocell technology takes the fixed network as its backhaul and its family access point is plug and play, and can be connected to any IP based transmitting network.

The wireless propagation feature of traditional macro cell is bad penetration performance against buildings, which cause the indoor service quality to degrade. The emerging of the Femtocell technology effectively improves the indoor coverage and service quality.

FIG. 1 shows a schematic diagram of transmitting mobile Multimedia Broadcast/Multicast Service (MBMS) via fixed backhaul in the existing telecommunication network using Femtocell technology. As shown in FIG. 1, the telecommunication network comprises the mobile base station 1, for example, the Base Station Router (BSR) (also called eNodeB or home NodeB) 1, the Access Node(AN) 2, the edge router 3, the Femtocell Gateway(GW) 4 and the Broadcast Multicast Service Center (BM-SC) 5. The Femtocell Gateway 4 is configured between the mobile core network and public IP network, and the Femtocell Gateway 4 converges and provides standard interfaces oriented to the mobile core network, for example, Iu_CS, Iu_PS, Gn/Gi and other network side interfaces. The BSR 1 is connected to the fixed access network via the access node 2. The fixed access network may be ADSL network, or FTTX network. FIG. 1 shows four BSRs 1a, 1b, 1c and 1d and two access nodes 2a and 2b n. Wherein, the BSRs 1a and 1b are connected to the access node 2a, and the BSRs 1c and 1d are connected to the access node 2b. The access nodes 2a and 2b establish connection with the edge router 3 via fixed access network or convergence network, and the edge router 3 is accessed to the public IP network, and is eventually connected to the mobile core network via the Femtocell GW 4. Wherein, the BM-SC 5 in the mobile core network provides mobile broadcast and multicast service. It can be appreciated that the four BSRs and two access nodes shown in FIG. 1 are only illustrative, the practical network is not limited to the above configuration or the number of network elements in the above configuration.

The process of wireless data transmission in the prior art is described briefly in the followings. When the mobile user terminal, such as a mobile phone or a PDA request the multicast service from the mobile core network, the mobile user terminal equipment sends multicast join message, for requesting to join in the multicast group. Accordingly, the BSR will send the multicast join message via Internet Protocol Security Tunnel (IPSec Tunnel). That is, encapsulating the multicast join message in the IPSec packet, and the destination address of the encapsulated IPSec packet is the egress of the tunnel, i.e., the Femtocell GW 4, and the source address of the encapsulated IPSec packet is the ingress of the tunnel, i.e., the IP address of the BSR. Similarly, when the mobile user terminals dominated by the BSR 1b-1d all request for the multicast service, the three BSRs respectively send the multicast join message via different IPSec tunnels. Under this situation, the multicast join message is directly sent via unicast tunnel from the corresponding BSR to the Femtocell GW 4, and the tunnel passes the fixed access network, and therefore, the multicast join message is invisible to each network element in the fixed access network, for example, access node, switch, router or edge router, thus the multicast backhaul can not be established in the fixed network, and therefore, the multicast service data can only be transmitted in unicast form in the fixed network. Therefore, when the mobile user terminal equipments dominated by the BSR 1a-1d all request multicast service from the BM-SC 5, even if the four BSRs request the same multicast service from the mobile core network, for example, multicast service 60, the Femtocell GW 4 still sends four copies of the multicast service 60, that is 60a,60b, 60c and 60d to the four BSRs via four IPSec tunnels in unicast form, that is sending to BSRs 1a-1d in unicast form.

Therefore, the existing method of transmitting MBMS services between the mobile core network and the Femtocell occupies huge network resources in the fixed network, and brings a heavy working burden to the network devices, such as gateway, edge router, and access node.

SUMMARY OF THE INVENTION

Based on the problem of the existing technology, the present invention proposes a method for the mobile base station to aid the upper network device in the fixed network to establish backhaul in the fixed network.

According to a first aspect of the present invention, there is provided a method, in a mobile base station, of aiding an upper network device in a fixed network to establish multicast backhaul in the fixed network for a mobile user terminal equipment dominated by the mobile base station to access multicast service of a mobile core network, wherein the method comprises: obtaining, from the mobile user terminal equipment, a multicast join message to request for a mobile multicast service; aiding the upper network device to establish the multicast backhaul in the fixed network for the mobile multicast service according to the multicast join message.

Preferably, the method comprises the following step: sending the multicast join message to the upper network device in the fixed network, so as to aid the upper network device in the fixed network to establish the multicast backhaul in the fixed network.

According to a second aspect of the present invention, there is provided a controlling apparatus, in a mobile base station, for aiding an upper network device in a fixed network to establish multicast backhaul in the fixed network for a mobile user terminal equipment dominated by the mobile base station to access multicast service of a mobile core network, comprising: a first means for obtaining, for obtaining from the mobile user terminal equipment, a multicast join message to request for a mobile multicast service; an aiding means, for aiding the upper network device to establish the multicast backhaul in the fixed network for the mobile multicast service according to the multicast join message.

Preferably, the aiding means further comprises a sending means, for sending the multicast join message to the upper network device in the fixed network, so as to aid the upper network device in the fixed network to establish the multicast backhaul in the fixed network.

With the technical solution provided by the present invention, the network resources in the fixed network is saved, and the heavy working load of the network elements in the fixed network, such as gateway, edge router, access node, is reduced.

BRIEF DESCRIPTION OF DRAWINGS

With reference to the following detailed description of the non-restrictive embodiments, other features, objects and advantages of the present invention will be more apparent.

Wherein same or similar reference numerals refer to same or similar step features or apparatuses (modules).

DETAILED DESCRIPTION OF EMBODIMENTS

Figure 1:
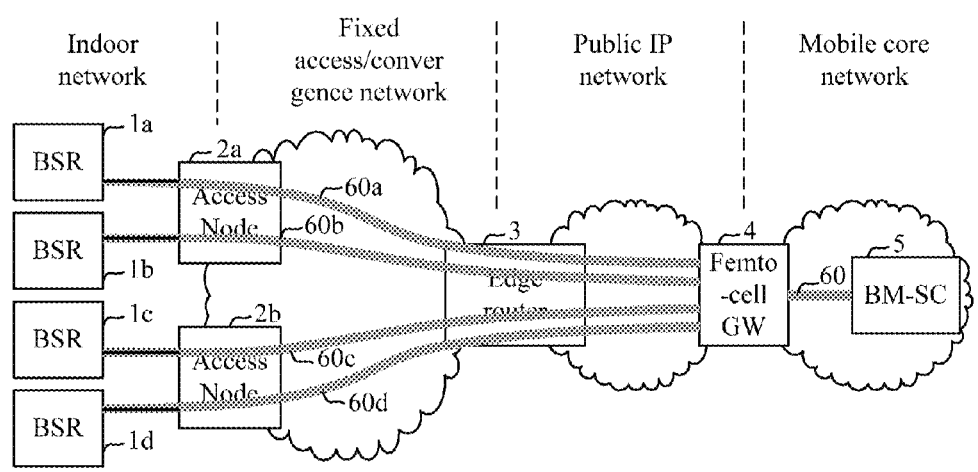
FIG. 1 shows a schematic diagram of the existing technology for transmitting mobile broadcast/multicast service via fixed unicast backhaul in the telecommunication network using Femtocell technology.
Figure 2:
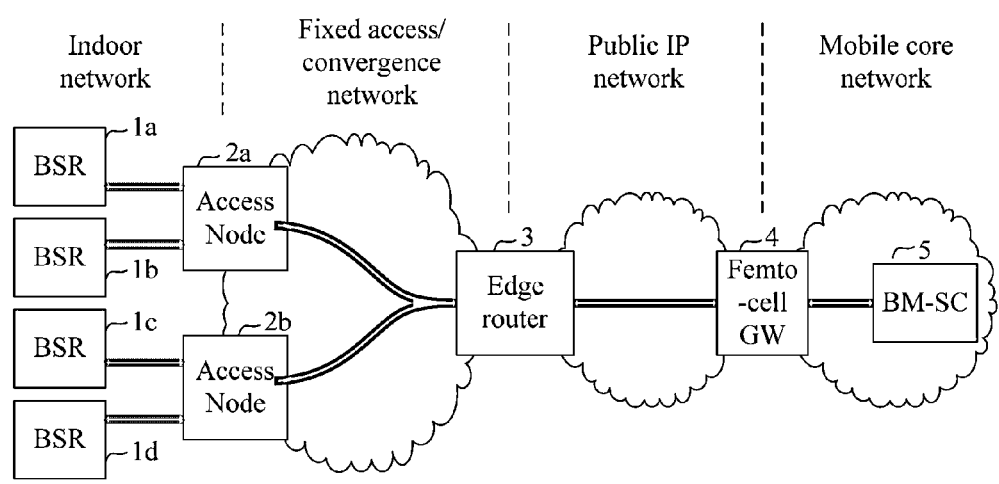
FIG. 2 shows a schematic diagram of the network topology of the present invention for transmitting mobile multicast service via fixed multicast backhaul in the telecommunication network using Femtocell technology.

FIG. 2 is taken as an example for illustrating the network topology of the present invention. As shown in FIG. 2, the telecommunication network comprises the mobile base station 1a-1d, the Access Nodes (AN) 2a and 2b, the edge router 3, the Femtocell Gateway (GW) 4 and the Broadcast Multicast Service Center (BM-SC) 5. The Femtocell Gateway 4 is configured between the mobile core network and public IP network. The BSR 1 is connected to the fixed access network via the access node 2. The fixed access network may be ADSL network, or FTTX network. FIG. 2 shows four BSRs 1a, 1b, 1c and 1d and two access nodes 2a and 2b n. Wherein, the BSRs 1a and 1b are connected to the access node 2a, and the BSRs 1c and 1d are connected to the access node 2b. The access nodes 2a and 2b establish connection with the edge router 3 via fixed access network or convergence network, and the edge router 3 is accessed to the public IP network, and is eventually connected to the mobile core network via the Femtocell GW 4. Wherein, the mobile base station may be Base Station Router (BSR), or also called eNodeB or home NodeB(H-NodeB), which integrate the functions of base station, router and Radio Network Controller (RNC), and it may sometimes even cover the functions of Service GPRS Support Node(SGSN), Gateway GPRS Support Node (GGSN), etc. The BM-SC(Broadcast Multicast Service Center) 5 in the mobile core network is used to provide mobile broadcast and multicast service. It can be appreciated that the four BSRs and two access nodes shown in FIG. 2 are only illustrative, while the practical network is not limited to the above configuration or the number of network elements in the above configuration. Besides, the network device connected with the BSR may also be small router, small switch, and is not limited to access device such as Digital Subscriber Line Access Multiplexer (DSLAM).

Now referring to FIG. 3, the method flowchart of the present invention is described as follows.

Figure 3:
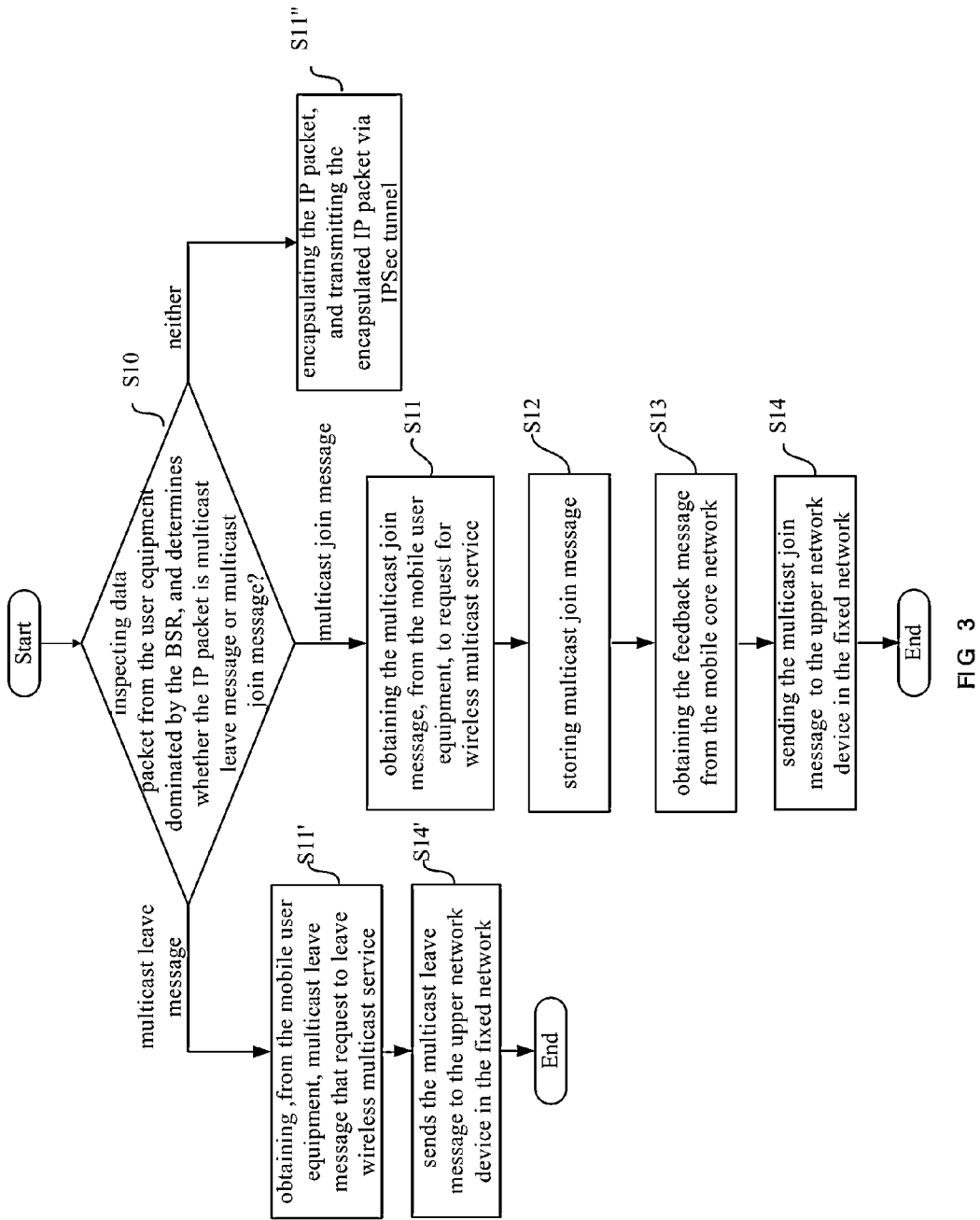
FIG. 3 shows a method flowchart of an example of the present invention.

As shown in FIG. 3, in step S10, the BSR inspects data packet from the mobile user terminal equipment dominated by the BSR. To be specific, the BSR searches the protocol type and message type of the header of the IP packet.

Case 1:

If the protocol type in the IP header is 2, it indicates that the data part of the IP packet comprises IGMP message. Then the BSR further searches the message type of the IGMP message.

i) If the message type of the IGMP message is 0x22, it indicates that the IGMP message is a version 3 multicast join message, i.e., Version 3 Membership Report; or ii) if the message type of the IGMP message is 0x12, it indicates that the IGMP is a version 1 multicast join message, i.e., Version 1 Membership Report; or iii) if the message type of the IGMP message is 0x16, it indicates that the IGMP is a version 2 multicast join message, i.e., Version 2 Membership Report; (please refer to RFC 3376: http://www.ietforg/rfc/rfc3376.txt?number=3376, Internet Group Management Protocol, Version 3), then in the above three cases, namely the IGMP message is a multicast join message, the method enters step S11, the BSR obtains the multicast join message, from the mobile user terminal equipment, to request for mobile multicast service, that is, Membership Report Message, or IGMP join message.

Case 2:

If the protocol type in the IP header is 2, it indicates that the data part of the IP packet comprises IGMP message. Then the BSR further searches the message type of the IGMP message.

i) If the message type of the IGMP message is 0x17, it indicates that the IGMP message is a Version 2 Leave Group, that is, multicast leave message, then the method enters step S11'.

Case 1 and case 2 focus on the situation that the BSR inspects IPv4 data packet. The following case 3 and case 4 focus on the situation that the BSR inspects IPv6 data packet.

Case 3:

If the protocol type in the IP header is 1, it indicates that the data part of the IP packet comprises ICMP message. Then the BSR further searches the message type of the ICMP message. If the message type of the ICMP message is 58, it indicates that the ICMPv6 message carries the MLD (Multicast Listener Discovery) message, then the BSR further searches the message type of the MLD message.

i) If the message type of the MLD message is 143 in decimal, it indicates that the MLD message is a Version 2 Multicast Listener Report (Type=decimal 143) (Please refer to RFC 3810: http://www.ietforg/rfc/rfc3810.txt?number=3810); or ii) if the message type of the MLD is 131 in decimal, it indicates that the MLD message is a Version 1 Multicast Listener Report (Type=decimal 131) (Please refer to RFC 2710: http://www.ietforg/rfc/rfc2710.txt?number=2710); then for i) and ii) in case 3, the MLD message is a multicast join message, then the method enters step S11, the BSR obtains the multicast join message, from the mobile user terminal equipment, to request for mobile multicast service, that is, Membership Report Message, or MLD join message.

Case 4:

If the protocol type in the IP header is 1, it indicates that the data part of the IP packet comprises ICMP message. Then the BSR further searches the message type of the ICMP message. If the message type of the ICMP message is 58, it indicates that the ICMPv6 message carries the MLD (Multicast Listener Discovery) message, then the BSR further searches the message type of the MLD message.

i) If the message type of the MLD is 132 in decimal, it indicates that the MLD message is a Version 1 Multicast Done message namely the Version 1 Multicast Listener Done (Type=decimal 132) (Please refer to RFC 2710: http://www.ietf.org/rfc/rfc2710.txt?number=2710), when a host leaves an IPv6 multicast group, the host correspondingly sends a MLD done message, that is a multicast leave message, then the method enters step S11'.

In step S10, if the BSR inspects the protocol type and message type of the IP packet, and determines that the IP packet belongs to none of the above four cases, that is, the IP packet neither belongs to the multicast join message, nor belongs to the multicast leave message, then the method enters step S11", the BSR directly encapsulates the IP packet via IPSec, that is, carry out IP-in-IP encapsulation for the IP packet. The destination address of the encapsulated IP packet is the address of the Femtocell GW 4, the BSR transmits the encapsulated IP packet directly to the egress of the IPSec tunnel: the Femtocell GW 4, via the IPSec tunnel.

In the followings, the subsequent steps of the invention with respect to case 1 and case 3 are described first. When in step S11, the BSR obtains the multicast join message that requests for the mobile multicast service from the mobile user terminal equipment, the method enters step S12, the BSR copies the multicast join message, and saves the copy of the multicast join message in the BSR.

Besides, the BSR performs IP-in-IP encapsulation for the multicast join message, and forwards the multicast join message via the IPSec tunnel. The ingress of the tunnel is the IP address of the BSR, and the egress of the tunnel is the IP address of the Femtocell GW 4, which aims to establish the wireless multicast bearer of the multicast service in the mobile network, which is not shown in FIG. 3.

After the encapsulated data packet forwarded via the IPSec tunnel reaches the Femtocell GW 4, the Femtocell GW 4 de-capsulates the packet, and forwards it to the mobile core network for processing. The mobile core network carries out corresponding authentication on the multicast join message, and establishes wireless multicast bearer in mobile network for the multicast service, so as to generate the MBMS UE context. The implementation details have been recorded in the prior art, and can be referred to in the standard 3GPP TS 23.246, which is omitted for simplicity.

Then, in step S13, the BSR obtains a feedback message from the mobile core network, which is MBMS UE context.

Then, after the BSR receives the MBMS UE context from the mobile core network, the method enters step S14. in step S14, the BSR sends the multicast join message stored in step S12 to the upper network device in the fixed network, so as to aid the upper network device in the fixed network to establish the multicast backhaul in the fixed network.

To be specific, the BSR finds the corresponding multicast join message from the stored plurality of multicast join messages according to the source address and destination address in the MBMS UE context. For example, the BSR receives the feedback information from the mobile core network, and the related source address in the MBMS UE context is the IP address of the mobile user terminal equipment, for example, 101.0.0.11, and the related destination address is the multicast address being 224.0.0.22. Then the BSR searches the plurality of multicast join messages from the mobile user terminal equipment stored in the BSR, according to the feedback message, and finds the multicast join message with the destination address being multicast address 224.0.0.22 and the source address being the IP address of the mobile user terminal equipment, for example, 101.0.0.11. Then the BSR determines that the multicast message is the multicast join message corresponding to the fed back MBMS UE context. Then, the BSR sends the multicast join message corresponding to the fed back MBMS UE context to the upper network device in the fixed network. In the topology shown in FIG. 2, the upper network device of BSR is an access node, for example, DSLAM, however, the application scenario of BSR is not limited thereto. The upper network device of the BSR may be small switch, small router, wherein the small router corresponds to the FTTX connection scenario. Therefore, according to different network topologies, the BSR sends the multicast join message to its connected upper network device.

As the upper network device in the fixed network receives the multicast join message from the BSR, the upper network device in the fixed network may record the source address and destination address of the multicast join message, configure the corresponding port according to existing flow, and forward the multicast join message according to the corresponding routing protocol, and finally establish the multicast tree.

Considering that the upper network device in the fixed network of the BSR may be sensitive to the source address in the mobile network, that is, when the source address is the address in the mobile network, for example, when the upper network device in the fixed network receives the message sourced from the mobile user terminal equipment with the address 101.0.0.11, the upper network device in the fixed network may consider that the source address of the message does not belong to fixed network segment, and discard the message directly. To cope with the above situation, in a varied embodiment, before the BSR enters the step S14, the method further comprises:

Changing the source address of the multicast join message to the IP address of the BSR. The IP address of the BSR is allocated by the fixed network, and belongs to the fixed network segment, for example, the IP address of the BSR is 202.0.0.11, and therefore, the BSR modifies the source address of the multicast join message to the IP address of the BSR 202.0.0.11, then the method enters step S14, the multicast join message with the modified source address is sent to the upper network device in the fixed network of the BSR.

In the above embodiment, after the BSR finishes the step S13, that is, after the BSR obtains the feedback message from the mobile core network, the method enters step S14, the multicast join message is sent to the upper network device in the fixed network. It should be noted that, the above implementing order is only illustrative. In a varied embodiment, the step S12 may be omitted, and implementing of steps S13 and S14 does not have strict sequence. That is, after the step S11 of obtaining the multicast join message that request for the mobile multicast service from the mobile user terminal equipment, the BSR does not need to buffer the multicast join message, and directly enters step S14, that is the BSR sends the multicast join message to the upper network device in the fixed network, and then the BSR sends the multicast join message to the Femtocell GW 4 via the IPSec tunnel, and then the message is de-capsulated by the Femtocell GW 4 and sent to the mobile core network, that is, the process that the BSR triggers the establishment of the multicast backhaul in the fixed network for the mobile multicast service does not depend on the feedback from the mobile core network. Besides, the BSR further establishes wireless multicast bearer in the mobile network, which is omitted here and is not shown in FIG. 3. The varied embodiment saves time. However, if the request for mobile multicast service is not authenticated by the mobile core network, it may cause the invalid of the multicast backhaul established in the fixed network, for example the multicast tree, etc.

The each above embodiment all focus on the situation that the multicast message is a multicast join message. In the followings, the description of the embodiments related to case 2 and case 4, that is, the multicast message is a multicast leave message will be given.

When in step S10, the BSR determines that the IP packet from the mobile user terminal equipment belongs to cases 2 and 4, then the method enters step S11', the BSR obtains the multicast leave message for leaving the mobile multicast group from the mobile user terminal equipment.

Then, the method directly enters step S14', the BSR directly sends the multicast leave message to the upper network device in the fixed network. It should be noted that since the BSR request to leave a multicast group, it does not need to be authenticated by the mobile core network, namely, the steps S12 and S13 are not necessary.

In a varied embodiment, considering that the upper network device of the BSR in the fixed network may also be sensitive to the source address belonging to the mobile network, that is, when the source address of the multicast leave message is an address in the mobile network, for example, when the network device in the fixed network receives a multicast leave message originated from the mobile user terminal equipment with the source address 101.0.0.11, the upper network device may discard the message since the IP address of the message does not belong to the fixed network. For coping with the above solution, in a varied embodiment, before the BSR enters the step S14', the BSR further needs to carry out the following step:

changing the source address of the multicast leave message to the address of the BSR. The IP address of the BSR is allocated by the fixed network, which belongs to the fix network segment, for example, the IP address of the BSR is 202.0.0.11. Therefore, the BSR modifies the source IP address of the multicast leave message to the IP address of the BSR: 202.0.0.11. Then the method enters step S14', the BSR sends the multicast leave message with the modified source address to the upper network device of the BSR. In the topology shown in FIG. 2, the upper network device of BSR is an access node, for example, DSLAM, however, the application scenario of BSR is not limited thereto. The upper network device of the BSR may be small switch, small router, wherein the small router corresponds to the FTTX connection scenario. Therefore, according to different network topologies, the BSR sends the multicast leave message to its connected upper network device.

Figure 4:
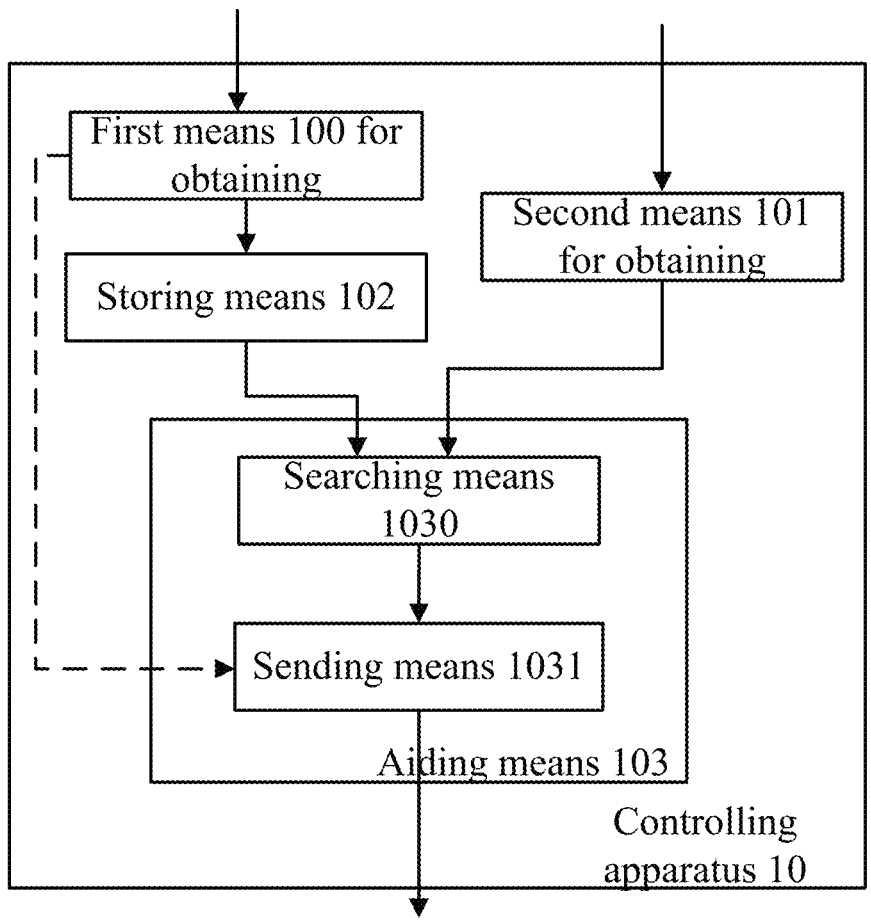
FIG. 4 shows an apparatus block diagram of an example of the present invention.

Now referring to FIG. 4 with combination of FIG. 2 and FIG. 3, the device block diagram of the present invention is described as follows. FIG. 4 shows the block diagram of the control device 10 in the BSR 1 of the mobile telecommunication network according to one embodiment of the present invention. Wherein, the control device 10 is located in the BSR 1a to BSR 1d shown in FIG. 2. The control device 10 comprises a first means 100 for obtaining, a second means 101 for obtaining, a storing means 102 and an aiding means 103. Wherein, the aiding means 103 further comprises searching means 1030 and sending means 1031.

As shown in FIG. 4, the BSR inspects data packet from the mobile user terminal equipment dominated by the BSR. To be specific, the BSR searches the protocol type and message type in the header of the IP packet.

Case 1:

If the protocol type in the IP header is 2, it indicates that the data part of the IP packet comprises IGMP message. Then the BSR further searches the message type of the IGMP message.

i) If the message type of the IGMP message is 0x22, it indicates that the IGMP message is a version 3 multicast join message, i.e., Version 3 Membership Report; or ii) if the message type of the IGMP message is 0x12, it indicates that the IGMP is a version 1 multicast join message, i.e., Version 1 Membership Report; or iii) if the message type of the IGMP message is 0x16, it indicates that the IGMP is a version 2 multicast join message, i.e., Version 2 Membership Report; (please refer to RFC 3376: http://www.ietforg/rfc/rfc3376.txt?number=3376, Internet Group Management Protocol, Version 3), then in the above three cases, namely the IGMP message is a multicast join message, the first means 100 of obtaining obtains the multicast join message, from the mobile user terminal equipment, to request for mobile multicast service, that is, Membership Report Message, or IGMP join message.

Case 2:

If the protocol type in the IP header is 2, it indicates that the data part of the IP packet comprises IGMP message. Then the BSR further searches the message type of the IGMP message.

i) If the message type of the IGMP message is 0x17, it indicates that the IGMP message is a Version 2 Leave Group, that is, multicast leave message, then the first means 100 for obtaining obtains the multicast leave message for request to leave the mobile multicast group from the mobile user terminal equipment.

Case 1 and case 2 focus on the situation that the BSR inspects IPv4 data packet. The following case 3 and case 4 focus on the situation that the BSR inspects IPv6 data packet.

Case 3:

If the protocol type in the IP header is 1, it indicates that the data part of the IP packet comprises ICMP message. Then the BSR further searches the message type of the ICMP message. If the message type of the ICMP message is 58, it indicates that the ICMPv6 message carries the MLD (Multicast Listener Discovery) message, then the BSR further searches the message type of the MLD message.

i) If the message type of the MLD message is 143 in decimal, it indicates that the MLD message is a Version 2 Multicast Listener Report (Type=decimal 143) (Please refer to RFC 3810: http://www.ietforg/rfc/rfc3810.txt?number=3810); or ii) if the message type of the MLD is 131 in decimal, it indicates that the MLD message is a Version 1 Multicast Listener Report (Type=decimal 131) (Please refer to RFC 2710: http://www.ietforg/rfc/rfc2710.txt?number=2710); then for i) and ii) in case 3, the MLD message is a multicast join message, then the first means 100 for obtaining obtains the multicast join message, from the mobile user terminal equipment, to request for mobile multicast service, that is, Membership Report Message, or MLD join message.

Case 4:

If the protocol type in the IP header is 1, it indicates that the data part of the IP packet comprises ICMP message. Then the BSR further searches the message type of the ICMP message. If the message type of the ICMP message is 58, it indicates that the ICMPv6 message carries the MLD (Multicast Listener Discovery) message, then the BSR further searches the message type of the MLD message.

i) If the message type of the MLD is 132 in decimal, it indicates that the MLD message is a Version 1 Multicast Done message namely the Version 1 Multicast Listener Done (Type=decimal 132) (Please refer to RFC 2710: http://www.ietf.org/rfc/rfc2710.txt?number=2710), when a host leaves an IPv6 multicast group, the host correspondingly sends a MLD done message, that is a multicast leave message, then the first means 100 for obtaining obtains the multicast leave message to request to leave the mobile multicast service from the mobile user terminal equipment.

If the BSR inspects the protocol type and message type of the IP packet, and determines that the IP packet belongs to none of the above four cases, that is, the IP packet neither belongs to the multicast join message, nor belongs to the multicast leave message, then the BSR directly encapsulates the IP packet via IPSec, that is, carrying out IP-in-IP encapsulation for the IP packet. The destination address of the encapsulated IP packet is the address of the Femtocell GW 4, and the BSR transmits the encapsulated IP packet directly to the egress of the IPSec tunnel, the Femtocell GW 4, via the IPSec tunnel.

In the followings, the subsequent steps of the invention with respect to case 1 and case 3 are described first. When the first means 100 for obtaining obtains the multicast join message that requests for the mobile multicast service from the mobile user terminal equipment, the storing means 102 copies the multicast join message, and saves the copy of the multicast join message in the BSR.

Besides, the BSR performs IP-in-IP encapsulation for the multicast join message, and forwards the multicast join message via the IPSec tunnel. The ingress of the tunnel is the IP address of the BSR, and the egress of the tunnel is the IP address of the Femtocell GW 4, which aims to establish the wireless multicast bearer of the multicast service in the mobile network, which is not shown in FIG. 4.

Besides, the BSR further establishes wireless multicast bearer in the mobile network, to facilitate the BSR to transmit multicast service to the mobile user terminal equipment in the mobile network. Since the step is the same as that in the prior art, therefore is omitted for simplicity, and is not shown in FIG. 4.

After the encapsulated data packet forwarded via the IPSec tunnel reaches the Femtocell GW 4, the Femtocell GW 4 de-capsulates the packet, and forwards it to the mobile core network for processing. The mobile core network carries out corresponding authentication on the multicast join message, and establishes wireless multicast bearer in mobile network for the multicast service, so as to generate the MBMS UE context. The implementation details have been recorded in the prior art, and can be referred to in the standard 3GPP TS 23.246, which is omitted for simplicity.

Then, the second means 101 for obtaining obtains a feedback message from the mobile core network, that is, MBMS UE context.

Then, after the second means 101 for obtaining receives the MBMS UE context from the mobile core network, the sending means 1031 in the aiding means 103 sends the multicast join message stored in storing means 102 to the upper network device in the fixed network, so as to aid the upper network device in the fixed network to establish the multicast backhaul in the fixed network.

To be specific, the searching means 1030 in the aiding means 103 finds the corresponding multicast join message from the stored plurality of multicast join messages according to the source address and destination address in the MBMS UE context. For example, the second means 101 for obtaining receives the feedback information from the mobile core network, and the related source address in the MBMS UE context is the IP address of the mobile user terminal equipment, for example, 101.0.0.11, and the related destination address is the multicast address being 224.0.0.22. Then the searching means 1030 searches the plurality of multicast join messages from the mobile user terminal equipment stored in the BSR, according to the feedback message, and finds the multicast join message with the destination address being multicast address 224.0.0.22 and the source address being the IP address of the mobile user terminal equipment, for example, 101.0.0.11. Then the searching means 1030 determines that the multicast message is the multicast join message corresponding to the fed back MBMS UE context. Then, the sending means 1031 sends the multicast join message corresponding to the fed back MBMS UE context to the upper network device in the fixed network. In the topology shown in FIG. 2, the upper network device of BSR is an access node, for example, DSLAM, however, the application scenario of BSR is not limited thereto. The upper network device of the BSR may be small switch, small router, wherein the small router corresponds to the FTTX connection scenario. Therefore, according to different network topologies, the sending means 1031 sends the multicast join message to its connected upper network device.

As the upper network device in the fixed network receives the multicast join message from the BSR, the upper network device in the fixed network may record the source address and destination address of the multicast join message, configure the corresponding port according to existing flow, and forward the multicast join message according to the existing routing protocol, and finally establish the multicast tree.

Considering that the upper network device in the fixed network of the BSR may be sensitive to the source address in the mobile network, that is, when the source address is the address in the mobile network, for example, when the upper network device in the fixed network receives the message sourced from the mobile user terminal equipment with the address 101.0.0.11, the upper network device in the fixed network may consider that the source address of the message does not belong to fixed network segment, and discard the message directly. To cope with the above situation, in a varied embodiment, the control device 10 further comprising an updating means (not shown in the Figs), the updating means is further used to carry out the following steps:

Changing the source address of the multicast join message to the IP address of the BSR. The IP address of the BSR is allocated by the fixed network, and belongs to the fixed network segment, for example, the IP address of the BSR is 202.0.0.11, and therefore, the updating means modifies the source address of the multicast join message to the IP address of the BSR 202.0.0.11, then the sending means 1031 sends the multicast join message with the modified source address to the upper network device in the fixed network of the BSR.

In the above embodiment, after the second means 101 for obtaining obtains the feedback message from the mobile core network, the sending means 1031 sends the multicast join message to the upper network device in the fixed network. It should be noted that, the above implementing order is only illustrative. In a varied embodiment, the storing means 102 may be omitted, and the operations performed by the second means 101 for obtaining and the sending means 1031 do not have strict sequence. That is, after the first means 100 for obtaining obtains the multicast join message that request for the mobile multicast service from the mobile user terminal equipment, the sending means 1031 directly sends the multicast join message to the upper network device in the fixed network, and then the sends the multicast join message to the Femtocell GW 4 via the IPSec tunnel, and then the message is de-capsulated by the Femtocell GW 4 and sent to the mobile core network, that is, the process that the BSR triggers the establishment of the multicast backhaul in the fixed network for the mobile multicast service does not depend on the feedback from the mobile core network. Besides, the BSR further establishes wireless multicast bearer in the mobile network, which is omitted here and is not shown in FIG. 4. The varied embodiment saves time. However, if the request for mobile multicast service is not authenticated by the mobile core network, it may cause the invalid of the multicast backhaul established in the fixed network, for example the multicast tree, etc.

The each above embodiment all focus on the situation that the multicast message is a multicast join message. In the followings, the description of the embodiments related to case 2 and case 4, that is, the multicast message is a multicast leave message will be given.

When the BSR determines that the IP packet from the mobile user terminal equipment belongs to cases 2 and 4, then the first means 100 for obtaining obtains the multicast leave message for leaving the mobile multicast group from the mobile user terminal equipment.

Then, as shown by the dotted line in FIG. 4, the sending means 1031 directly sends the multicast leave message to the upper network device in the fixed network. It should be noted that since the BSR request to leave a multicast group, it does not need to be authenticated by the mobile core network, namely, the second means 101 for obtaining, the storing means 102 and the searching means 1030 may all be omitted.

In a varied embodiment, considering that the upper network device of the BSR in the fixed network may also be sensitive to the source address belonging to the mobile network, that is, when the source address of the multicast leave message is an address in the mobile network, for example, when the network device in the fixed network receives a multicast leave message originated from the mobile user terminal equipment with the source address 101.0.0.11, the upper network device may discard the message since the IP address of the message does not belong to the fixed network. For coping with the above solution, in a varied embodiment, the aiding means 103 in the controlling means 10 further comprises an updating means (not shown in FIG. 4), which is used to carry out the following operation:

changing the source address of the multicast leave message to the address of the BSR. The IP address of the BSR is allocated by the fixed network, which belongs to the fix network segment, for example, the IP address of the BSR is 202.0.0.11. Therefore, the updating means modifies the source IP address of the multicast leave message to the IP address of the BSR: 202.0.0.11. Then the sending means 1031 sends the multicast leave message with the modified source address to the upper network device of the BSR. In the topology shown in FIG. 2, the upper network device of BSR is an access node, for example, DSLAM, however, the application scenario of BSR is not limited to this. The upper network device of the BSR may be small switch, small router, wherein the small router corresponds to the FTTX connection scenario. Therefore, according to different network topologies, the BSR sends the multicast leave message to its connected upper network device.

The above is the description of the embodiments of the present invention. However, the present invention is not limited to specific system, apparatus or specific protocol. Those skilled in the art may carry out various modification or variation in the scope of the appended claims.

The invention claimed is:

1. A method, in a mobile base station, of aiding an upper network device in a fixed network to establish multicast backhaul in the fixed network for a mobile user terminal equipment, dominated by the mobile base station, to access multicast service of a mobile core network, the method comprising:

obtaining, from the mobile user terminal equipment, a multicast join message requesting a mobile multicast service;

obtaining a feedback message from the mobile core network upon obtaining the multicast join message, the feedback information including information that the mobile core network has already established wireless multicast bearer for the mobile user terminal equipment; and sending the multicast join message to the upper network device based on the multicast join message and the feedback message, so as to aid the upper network device to establish the multicast backhaul in the fixed network.

2. The method according to claim 1, wherein the method further comprises:

storing the multicast join message upon obtaining the feedback message; and searching the stored multicast join message corresponding to the feedback message;

wherein the sending sends the stored multicast join message corresponding to the feedback message to the upper network device in the fixed network.

3. The method according to claim 2, wherein the method further comprises:

changing the source address in the multicast join message to the address of the mobile base station upon searching the stored multicast join message, wherein the sending sends the modified multicast join message corresponding to the feedback message to the upper network device in the fixed network.

4. The method according to claim 1, further comprising:

obtaining a multicast leave message to leave the mobile multicast service from the mobile user terminal equipment; and sending the multicast leave message to the upper network device in the fixed network.

5. The method according to claim 1, wherein the upper network device in the fixed network comprises at least one of an access node, a router and a switch.

6. A mobile base station comprising:

a controlling apparatus for aiding an upper network device in a fixed network to establish multicast backhaul in the fixed network for a mobile user terminal equipment dominated by the mobile base station to access multicast service of a mobile core network, the controlling apparatus configured to, obtain from the mobile user terminal equipment, a multicast join message requesting a mobile multicast service;

obtain a feedback message from the mobile core network upon obtaining the multicast join message, the feedback information including information that the mobile core network has already established wireless multicast bearer for the mobile user terminal equipment; and send the multicast join message to the upper network device based on the multicast join message and the feedback message, so as to aid the upper network device to establish the multicast backhaul in the fixed network.

7. The mobile base station according to claim 6, wherein the controlling apparatus is further configured to, store the multicast join message search a stored multicast join message corresponding to the feedback message, and send the stored multicast join message corresponding to the feedback message to the upper network device in the fixed network.

8. The mobile base station according to claim 7, wherein the controlling apparatus is further configured to, change a source address in the multicast join message to the address of the mobile base station, and send the modified multicast join message corresponding to the feedback message to the upper network device in the fixed network.

9. The mobile base station according to claim 6, wherein the controlling apparatus is further configured to, obtain a multicast leave message to leave the mobile multicast service from the mobile user terminal equipment, and send the leave message to the upper network device in the fixed network.

10. The mobile base station according claim 6, wherein the upper network device in the fixed network comprises at least one of an access node, a router and a switch.

11. A telecommunication network comprising:
the mobile base station according to claim 6.

* * * * *